United States Patent
Kulangara Muriyil et al.

(10) Patent No.: US 11,145,137 B1
(45) Date of Patent: Oct. 12, 2021

(54) METHOD AND SYSTEM FOR AUGMENTED REALITY BASED LIQUID MEASUREMENT AND MAPPING

(71) Applicant: Tata Consultancy Services Limited, Mumbai (IN)

(72) Inventors: Robin Tommy Kulangara Muriyil, Thiruvananthapuram (IN); Reshmi Ravindranathan, Thiruvananthapuram (IN); Zakhir Sidickk, Chennai (IN); Anantha Lakshmeeswari Chandarla, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/175,509

(22) Filed: Feb. 12, 2021

(30) Foreign Application Priority Data

Jul. 23, 2020 (IN) .............................. 202021031512

(51) Int. Cl.
*G06T 19/00* (2011.01)
*G06N 3/08* (2006.01)
*G06Q 50/12* (2012.01)
*G06Q 10/08* (2012.01)

(52) U.S. Cl.
CPC .............. *G06T 19/006* (2013.01); *G06N 3/08* (2013.01); *G06Q 10/087* (2013.01); *G06Q 50/12* (2013.01)

(58) Field of Classification Search
CPC .......... G06F 2111/18; G06F 3/011–015; G06F 3/0481; G06F 3/04817; G06F 9/4443; G06F 3/04847; G06F 11/3664; G06F 3/012; G06F 3/0304; G06K 9/00664–00704; G06T 19/00; G06T 17/00; G06T 7/00;
(Continued)

(56) References Cited

U.S. PATENT DOCUMENTS

| 7,982,201 B2 | 7/2011 | Bryant et al. |
| 2015/0046877 A1* | 2/2015 | Cuppari ............... G06Q 20/322 715/834 |
| 2020/0247661 A1* | 8/2020 | Rao .................. G05B 19/41875 |

OTHER PUBLICATIONS

Eppela, Sagi et al., "Computer vision-based recognition of liquid surfaces and phase boundaries in transparent vessels, with emphasis on chemistry applications", Computers Science, 2014, Arxiv, https://arxiv.org/ftp/arxiv/papers/1404/1404.7174.pdf.

* cited by examiner

*Primary Examiner* — Todd Buttram
(74) *Attorney, Agent, or Firm* — Finnegan, Henderson, Farabow, Garrett & Dunner, LLP (57) ABSTRACT

Augmented Reality is having numerous applications in the field of beverage industry. For example, in preparing cocktails. Conventional methods fail to provide an interactive AR based cocktail preparation, enabling the user to prepare cocktail. The present disclosure analyzes an image of a shelf to obtain a plurality of beverage types. A plurality of potential cocktails are generated based on the analysis and displayed to the user using 3D Augmented Reality (AR). A procedure for preparing a cocktail, requested by the user, is displayed near a located glassware kept by the user using 3D AR. A volume of the glassware is computed and a quantity of each beverage to be added is computed based on the volume. Further, a quantity of each beverage added by the user is dynamically measured by using 3D AR techniques and recommendations are provided to the user if there is any deviation.

11 Claims, 5 Drawing Sheets

(58) Field of Classification Search
CPC ... G06T 19/006; G06T 2215/16; H04N 5/272; H04N 2201/3245; A63F 13/10
See application file for complete search history.

METHOD AND SYSTEM FOR AUGMENTED REALITY BASED LIQUID MEASUREMENT AND MAPPING

PRIORITY CLAIM

This U.S. patent application claims priority under 35 U.S.C. § 119 to: India Application No. 202021031512, filed on Jul. 23, 2020. The entire contents of the aforementioned application are incorporated herein by reference.

TECHNICAL FIELD

The disclosure herein generally relates to the field of Augmented Reality (AR) and, more particular, to a method and system for augmented reality based liquid measurement and mapping.

BACKGROUND

Augmented Reality (AR) is having numerous application the field of food and beverage industry. For example, AR can engage a user in a public gathering by educating and entertaining the user. AR can also inspires the user to visualize, taste and experience a product in a different way. For example, AR can be used for effectively preparing cocktails. A cocktail is an alcoholic mixed drink with one or more spirit mixed with other ingredients including a fruit juice, flavored syrup or cream.

Conventional methods mainly provide only AR based visualization of various cocktails. Some other conventional methods create some colorful background themes and illusions when a glass and its coaster is being scanned by a camera. However, the cocktail is prepared by a bartender using the conventional methods. Hence the conventional methods fails to provide an interactive AR based cocktail preparation which enables the user to prepare cocktail and the corresponding AR based visualization.

SUMMARY

Embodiments of the present disclosure present technological improvements as solutions to one or more of the above-mentioned technical problems recognized by the inventors in conventional systems. For example, in one embodiment, a method for augmented reality based liquid measurement and mapping is provided. The method includes receiving an image pertaining to a shelf by one or more hardware processors via an image acquisition unit, wherein the shelf comprises a plurality of glass containers with beverages. Further, the method includes classifying the plurality of glass containers based on a plurality characteristics associated with each of the plurality of glass containers. Furthermore, the method includes generating a plurality of potential cocktails based on the plurality of classified glass containers and a quantity of each beverage in each of the plurality of classified glass containers. Furthermore, the method includes displaying the generated plurality of potential cocktails and a corresponding appearance of the plurality of potential cocktails using 3 Dimensional (3D) Augmented Reality (AR) on a flat surface, wherein the flat surface is located by a pre-trained Machine Learning (ML) model. Furthermore, the method includes receiving a cocktail request from a user, wherein the cocktail request is made by the user based on the plurality of potential cocktails displayed on the flat surface. Furthermore, the method includes locating a transparent glassware placed by the user on the flat surface by using the pre-trained ML model. Furthermore, the method includes dynamically displaying a procedure to prepare the requested cocktail near the located transparent glassware using the 3D AR. Furthermore, the method includes simultaneously computing a first set of 3D points associated with the transparent glassware using AR measurement techniques, wherein the first set of 3D points comprises a first base edge point, a second base edge point, a first top point and a second top point. Furthermore, the method includes computing a distance between the located transparent glassware and the image acquisition unit by using AR measurement techniques. Furthermore, the method includes computing a total volume of the transparent glassware based on the computed plurality of 3D points and the distance. Furthermore, the method includes dynamically determining the quantity of each of a plurality of beverages corresponding to the requested cocktail to be added in the transparent glassware based on the computed volume. Finally, the method includes dynamically detecting a quantity of each beverage added by the user in the transparent glassware each time by using dynamic liquid level detection, by: (i) identifying an upper level of each beverage added in the glass based on a difference in color between the transparent glassware and the added beverage using a color mapping algorithm (ii) computing a second set of 3D points on the upper level of the liquid, wherein the second set of 3D points comprises a first liquid top point, a second liquid top point (iii) computing a volume of the added beverage based on the computed second set of 3D points and the distance (iv) comparing the quantity of each beverage added into the transparent glassware with a corresponding predefined quantity of beverage to be added as per the dynamically displayed procedure to find any deviation in quantity of added beverage, wherein the deviation comprises one of, increase in quantity of added beverage and decrease in quantity of added beverage (v) recommending the user based on the deviation, wherein the recommendation includes (a) quantity of remaining beverages to be added, if there is increase in quantity of added beverage and (b) a plurality of available alternate beverages if there is any decrease in the quantity of added beverage (vi) updating an availability of each beverage based on the quantity of each beverage added to the requested cocktail each time and (vii) alarming a stock keeper when any of glass containers arranged in the shelf is emptied based on the updated information.

In another aspect, a system for augmented reality based liquid measurement and mapping is provided. The system includes at least one memory storing programmed instructions, one or more Input/Output (I/O) interfaces, and one or more hardware processors operatively coupled to the at least one memory, wherein the one or more hardware processors are configured by the programmed instructions to receive an image pertaining to a shelf by one or more hardware processors via an image acquisition unit, wherein the shelf includes a plurality of glass containers with beverages. Further, the one or more hardware processors are configured by the programmed instructions to classify the plurality of glass containers based on a plurality characteristics associated with each of the plurality of glass containers. Furthermore, the one or more hardware processors are configured by the programmed instructions to generate a plurality of potential cocktails based on the plurality of classified glass containers and a quantity of each beverage in each of the plurality of classified glass containers. Furthermore, the one or more hardware processors are configured by the programmed instructions to display the generated plurality of potential cocktails and a corresponding appearance of the plurality of potential cocktails using 3 Dimensional (3D) Augmented Reality (AR) on a flat surface, wherein the flat surface is located by a pre-trained Machine Learning (ML) model. Furthermore, the one or more hardware processors are configured by the programmed instructions to receive a cocktail request from a user, wherein the cocktail request is made by the user based on the plurality of potential cocktails displayed on the flat surface. Furthermore, the one or more hardware processors are configured by the programmed instructions to locate a transparent glassware placed by the user on the flat surface by using the pre-trained ML model. Furthermore, the one or more hardware processors are configured by the programmed instructions to dynamically display a procedure to prepare the requested cocktail near the located transparent glassware using the 3D AR. Furthermore, the one or more hardware processors are configured by the programmed instructions to simultaneously compute a first set of 3D points associated with the transparent glassware using AR measurement techniques, wherein the first set of 3D points includes a first base edge point, a second base edge point, a first top point and a second top point. Furthermore, the one or more hardware processors are configured by the programmed instructions to compute a distance between the located transparent glassware and the image acquisition unit by using AR measurement techniques. Furthermore, the one or more hardware processors are configured by the programmed instructions to compute a total volume of the transparent glassware based on the computed plurality of 3D points and the distance. Furthermore, the one or more hardware processors are configured by the programmed instructions to dynamically determine the quantity of each of a plurality of beverages corresponding to the requested cocktail to be added in the transparent glassware based on the computed volume. Finally, the one or more hardware processors are configured by the programmed instructions to dynamically detect a quantity of each beverage added by the user in the transparent glassware each time by using dynamic liquid level detection, by: (i) identifying an upper level of each beverage added in the glass based on a difference in color between the transparent glassware and the added beverage using a color mapping algorithm (ii) computing a second set of 3D points on the upper level of the liquid, wherein the second set of 3D points comprises a first liquid top point, a second liquid top point (iii) computing a volume of the added beverage based on the computed second set of 3D points and the distance (iv) comparing the quantity of each beverage added into the transparent glassware with a corresponding predefined quantity of beverage to be added as per the dynamically displayed procedure to find any deviation in quantity of added beverage, wherein the deviation comprises one of, increase in quantity of added beverage and decrease in quantity of added beverage (v) recommending the user based on the deviation, wherein the recommendation includes (a) quantity of remaining beverages to be added, if there is increase in quantity of added beverage and (b) a plurality of available alternate beverages if there is any decrease in the quantity of added beverage (vi) updating an availability of each beverage based on the quantity of each beverage added to the requested cocktail each time and (vii) alarming a stock keeper when any of glass containers arranged in the shelf is emptied based on the updated information.

In yet another aspect, a computer program product including a non-transitory computer-readable medium having embodied therein a computer program for method and system for augmented reality based liquid measurement and mapping is provided. The computer readable program, when executed on a computing device, causes the computing device to receive an image pertaining to a shelf by one or more hardware processors via an image acquisition unit, wherein the shelf includes a plurality of glass containers with beverages. Further, the computer readable program, when executed on a computing device, causes the computing device to classify the plurality of glass containers based on a plurality characteristics associated with each of the plurality of glass containers. Furthermore, the computer readable program, when executed on a computing device, causes the computing device to generate a plurality of potential cocktails based on the plurality of classified glass containers and a quantity of each beverage in each of the plurality of classified glass containers. Furthermore, the computer readable program, when executed on a computing device, causes the computing device to display the generated plurality of potential cocktails and a corresponding appearance of the plurality of potential cocktails using 3 Dimensional (3D) Augmented Reality (AR) on a flat surface, wherein the flat surface is located by a pre-trained Machine Learning (ML) model. Furthermore, the computer readable program, when executed on a computing device, causes the computing device to receive a cocktail request from a user, wherein the cocktail request is made by the user based on the plurality of potential cocktails displayed on the flat surface. Furthermore, the computer readable program, when executed on a computing device, causes the computing device to locate a transparent glassware placed by the user on the flat surface by using the pre-trained ML model. Furthermore, the computer readable program, when executed on a computing device, causes the computing device to dynamically display a procedure to prepare the requested cocktail near the located transparent glassware using the 3D AR. Furthermore, the computer readable program, when executed on a computing device, causes the computing device to simultaneously compute a first set of 3D points associated with the transparent glassware using AR measurement techniques, wherein the first set of 3D points includes a first base edge point, a second base edge point, a first top point and a second top point. Furthermore, the computer readable program, when executed on a computing device, causes the computing device to compute a distance between the located transparent glassware and the image acquisition unit by using AR measurement techniques. Furthermore, the computer readable program, when executed on a computing device, causes the computing device to compute a total volume of the transparent glassware based on the computed plurality of 3D points and the distance. Furthermore, the computer readable program, when executed on a computing device, causes the computing device to dynamically determine the quantity of each of a plurality of beverages corresponding to the requested cocktail to be added in the transparent glassware based on the computed volume. Finally, the computer readable program, when executed on a computing device, causes the computing device to dynamically detect a quantity of each beverage added by the user in the transparent glassware each time by using dynamic liquid level detection, by: (i) identifying an upper level of each beverage added in the glass based on a difference in color between the transparent glassware and the added beverage using a color mapping algorithm (ii) computing a second set of 3D points on the upper level of the liquid, wherein the second set of 3D points comprises a first liquid top point, a second liquid top point (iii) computing a volume of the added beverage based on the computed second set of 3D points and the distance (iv) comparing the quantity of each beverage added into the transparent glassware with a corresponding predefined quantity of beverage to be added as per the dynamically displayed procedure to find any deviation in quantity of added beverage, wherein the deviation comprises one of, increase in quantity of added beverage and decrease in quantity of added beverage (v) recommending the user based on the deviation, wherein the recommendation includes (a) quantity of remaining beverages to be added, if there is increase in quantity of added beverage and (b) a plurality of available alternate beverages if there is any decrease in the quantity of added beverage (vi) updating an availability of each beverage based on the quantity of each beverage added to the requested cocktail each time and (vii) alarming a stock keeper when any of glass containers arranged in the shelf is emptied based on the updated information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for augmented reality based liquid measurement and mapping to assist a user in efficient preparation of cocktails. The system for augmented reality based liquid measurement and mapping receives an image pertaining to a shelf where a plurality of glass containers are arranged. The image is further analyzed to obtain a plurality of beverage types associated with the shelf. A plurality of potential cocktails are generated based on the plurality of beverage types and displayed to the user using 3D Augmented Reality (AR). The user makes a cocktail request based on the plurality of potential cocktails. Further, a glassware kept by the user on a flat surface or table is located by the 3D AR technique and a procedure to prepare the requested cocktail is displayed near the located glassware using 3D AR. A volume of the located glassware is computed by using a first set of 3D points pertaining to the glassware. Then, a quantity of each beverage to be added is computed based on the volume of the glassware. Further, a quantity of each beverage added by the user is dynamically measured by using 3D AR techniques and recommendations are provided to the user if the added quantity is not as per the procedure. Further, a notification or alarm is sent to a store keeper if any of the beverage in the glass containers of the shelf is finished based on the consumption of beverages from the current cocktail preparation.

Referring now to the drawings, and more particularly to FIGS. 1 through 4B, where similar reference characters denote corresponding features consistently throughout the figures, there are shown preferred embodiments and these embodiments are described in the context of the following exemplary system and/or method.

Figure 1:
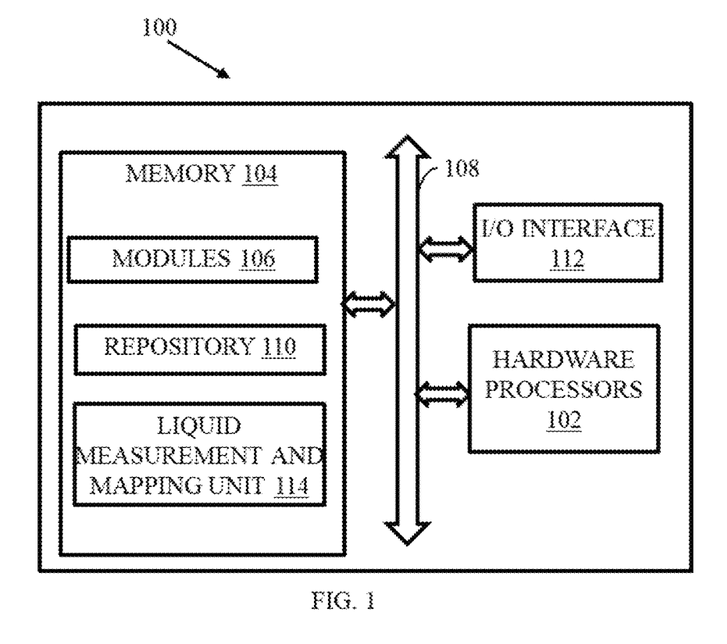
FIG. 1 is a functional block diagram of a system for augmented reality based liquid measurement and mapping, according to some embodiments of the present disclosure.

FIG. 1 is a functional block diagram of a system 100 for AR based liquid measurement and mapping, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a liquid measurement and mapping unit 114. The memory 104 also includes a data repository 110 for storing data processed, received, and generated by the plurality of modules 106 and the liquid measurement and mapping unit 114.

The plurality of modules 106 include programs or coded instructions that supplement applications or functions performed by the system 100 for augmented reality based liquid measurement and mapping. The plurality of modules 106, amongst other things, can include routines, programs, objects, components, and data structures, which performs particular tasks or implement particular abstract data types. The plurality of modules 106 may also be used as, signal processor(s), state machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for augmented reality based liquid measurement and mapping.

The data repository 110 may include a plurality of abstracted piece of code for refinement and data that is processed, received, or generated as a result of the execution of the plurality of modules in the module(s) 106 and the modules associated with the liquid measurement and mapping unit 114. The data repository may also include data associated with the machine learning model used in the method for augmented reality based liquid measurement and mapping.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2A:
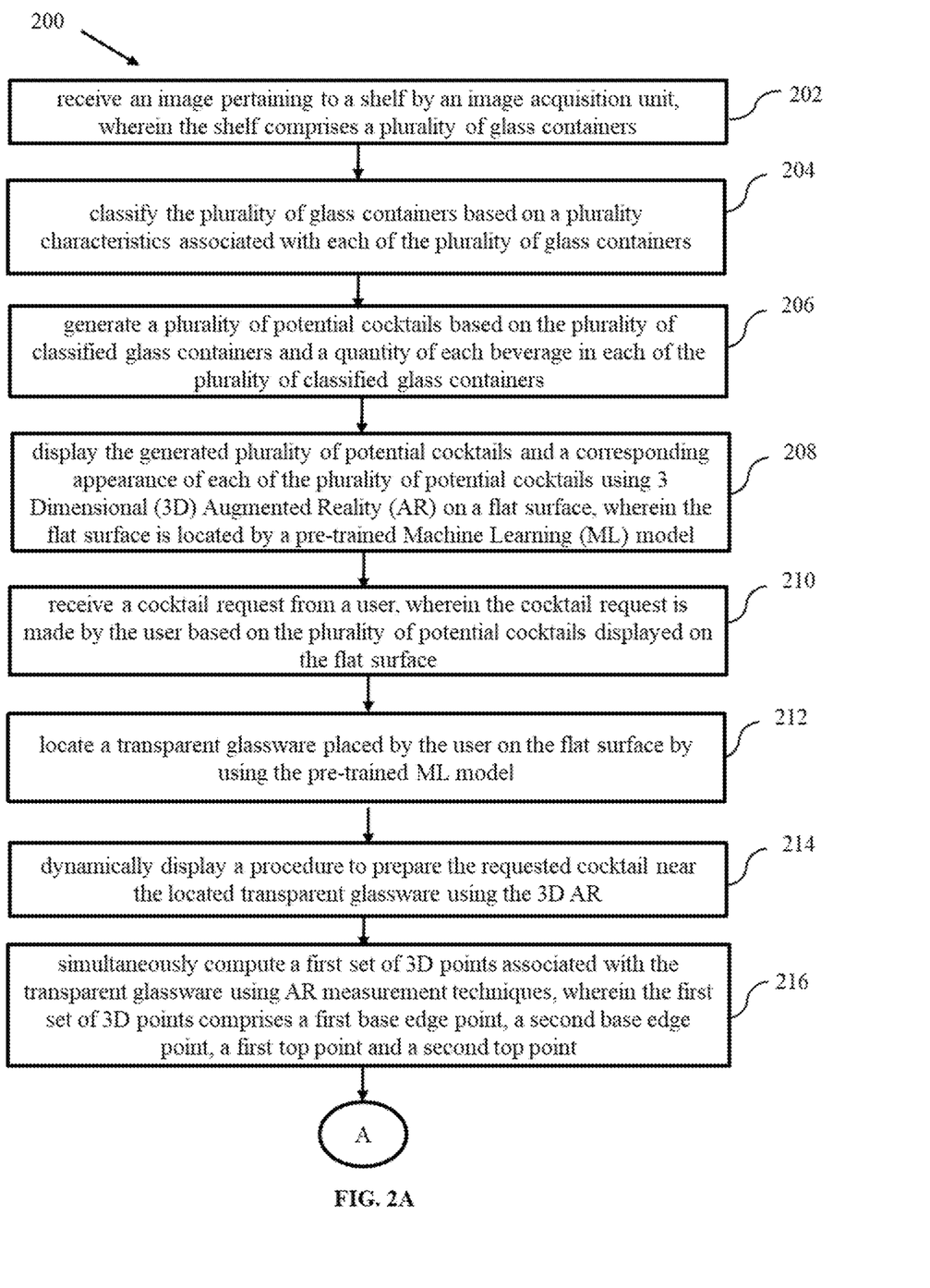
FIGS. 2A and 2B are exemplary flow diagrams for a method for augmented reality based liquid measurement and mapping implemented by the system of FIG. 1, in accordance with some embodiments of the present disclosure.
Figure 2B:
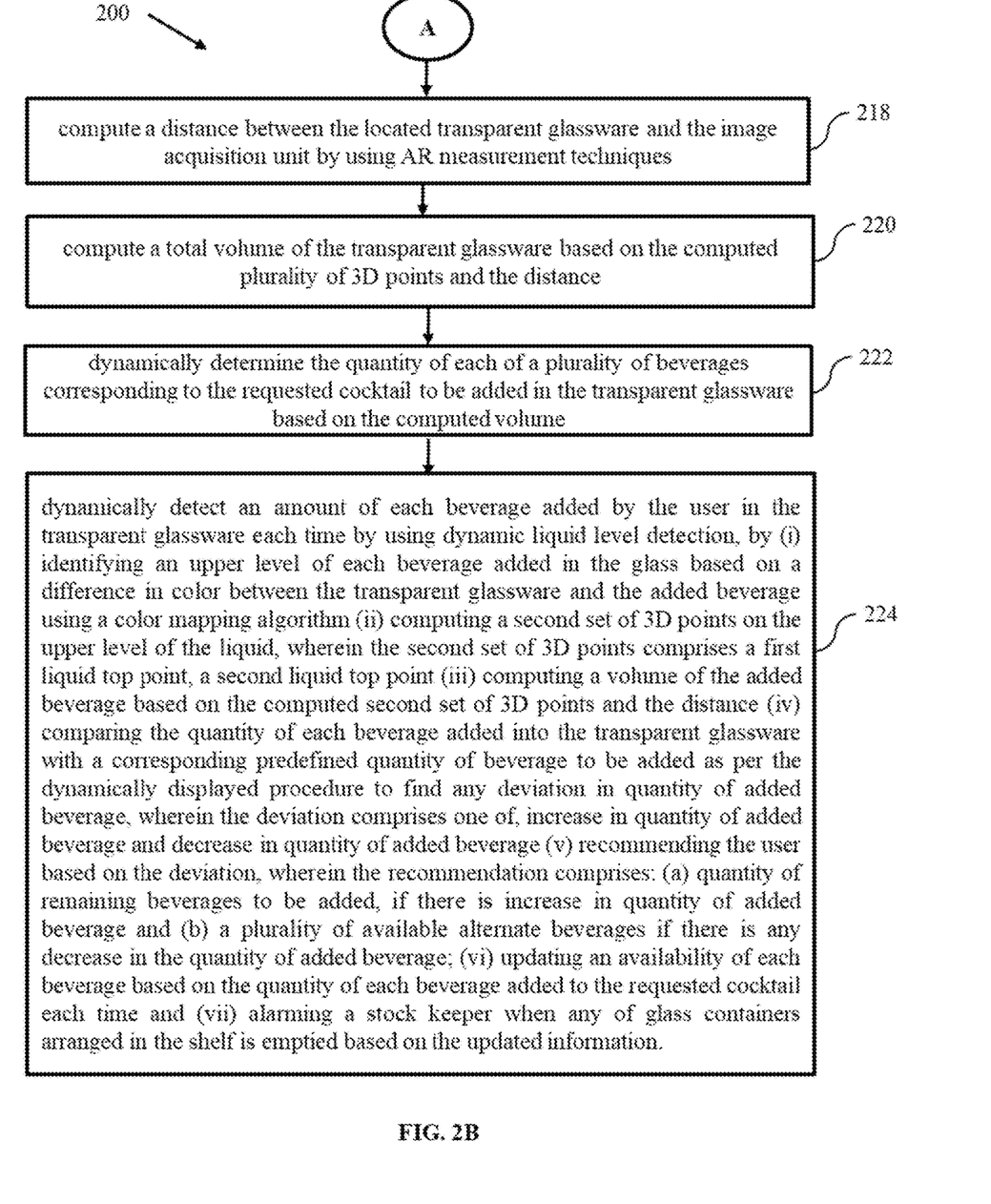

FIGS. 2A and 2B are exemplary flow diagrams for a processor implemented method for AR based liquid measurement and mapping implemented by the system of FIG. 1, according to some embodiments of the present disclosure. In an embodiment, the system 100 comprises one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 receive an image pertaining to a shelf or a cabinet by an image acquisition unit. In one embodiment, the image acquisition unit is mounted on the system 100. In another embodiment, the image acquisition unit is mounted in the vicinity. The image acquisition unit is communicably connected to the system 100 through a wired or wireless medium. The shelf or cabinet includes a plurality of glass containers.

At step 204 of the method 200, the one or more hardware processors 102 compute a plurality of beverage types by classifying the plurality of glass containers based on a plurality characteristics associated with each of the plurality of glass containers. The plurality of characteristics comprises a size, a color and a shape associated with each of the plurality of glass containers.

At 206 of the method 200, the one or more hardware processors 102 compute a plurality of potential cocktails based on the plurality of classified glass containers and a quantity of each beverage in each of the plurality of classified glass containers.

At 208 of the method 200, the one or more hardware processors 102 display the computed plurality of potential cocktails and a corresponding appearance of each of the plurality of potential cocktails using 3 Dimensional (3D) Augmented Reality (AR) on a flat surface, wherein the flat surface is located by a pre-trained Machine Learning (ML) model. The pre-trained ML model is a 3D object detection model. For example, the flat surface can be a table or a similar object At 210 of the method 200, the one or more hardware processors 102 receive a cocktail request from a user, wherein the cocktail request is made by the user based on the plurality of potential cocktails displayed on the flat surface. The cocktail includes a plurality of beverages mixed in a predefined proportion.

At 212 of the method 200, the one or more hardware processors 102 locate a transparent glassware placed by the user on the flat surface by using the pre-trained Machine Learning (ML) model.

At 214 of the method 200, the one or more hardware processors 102 dynamically display a procedure to prepare the requested cocktail near the located transparent glassware using the 3D AR. The procedure includes one of, a text based procedure, an image based procedure and a video based procedure. An outcome corresponding to each of a plurality of steps associated with the procedure is dynamically displayed using 3D AR.

At 216 of the method 200, the one or more hardware processors (102) simultaneously compute a first set of 3D points associated with the transparent glassware using AR measurement techniques. The first set of 3D points includes a first base edge point, a second base edge point, a first top point and a second top point as shown in FIG. 4B.

At 218 of the method 200, the one or more hardware processors 102 compute a distance between the located transparent glassware and the image acquisition unit by using AR measurement techniques.

At 220 of the method 200, the one or more hardware processors 102 compute a total volume of the transparent glassware based on the computed plurality of 3D points and the distance. For example, the transparent glassware can be represented as a trapezium or a rectangle or a square and the like based on the position of the plurality of 3D points.

At 222 of the method 200, the one or more hardware processors 102 dynamically determine the quantity of each of a plurality of beverages corresponding to the requested cocktail to be added in the transparent glassware based on the computed volume.

At 224 of the method 200, the one or more hardware processors 102 dynamically detect a quantity of each beverage added by the user in the transparent glassware each time by using dynamic liquid level detection. The method for dynamic liquid level detection includes the following steps. (i) identifying an upper level of each beverage added in the glass based on a difference in color between the transparent glassware and the added beverage using a color mapping algorithm (ii) computing a second set of 3D points on the upper level of the liquid, wherein the second set of 3D points comprises a first liquid top point, a second liquid top point (iii) computing a volume of the added beverage based on the computed second set of 3D points and the distance (iv) comparing the quantity of each beverage added into the transparent glassware with a corresponding predefined quantity of beverage to be added as per the dynamically displayed procedure to find any deviation in quantity of added beverage. The deviation can be an increase in quantity of added beverage or a decrease in quantity of added beverage (v) recommending the user based on the deviation, wherein the recommendation includes (a) quantity of remaining beverages to be added, if there is increase in quantity of added beverage and (b) a plurality of available alternate beverages if there is any decrease in the quantity of added beverage (vi) updating an availability of each beverage based on the quantity of each beverage added to the requested cocktail each time and (vii) alarming a stock keeper when any of glass containers arranged in the shelf is emptied based on the updated information.

Figure 3:
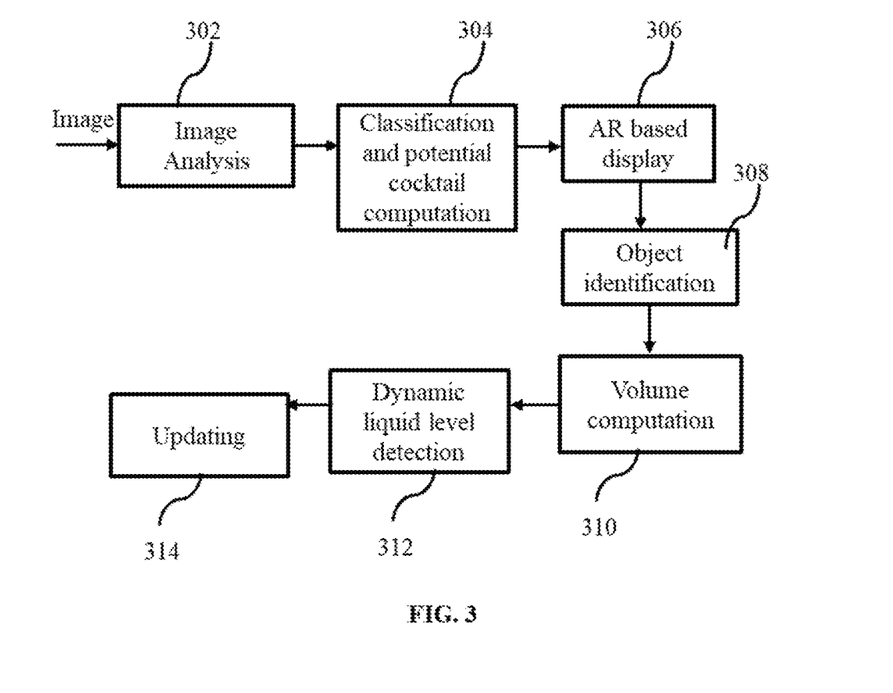
FIG. 3 illustrates an architectural overview of the system of FIG. 1 for augmented reality based liquid measurement and mapping, in accordance with some embodiments of the present disclosure.

FIG. 3 illustrates an architectural overview of the system of FIG. 1 for augmented reality based liquid measurement and mapping, in accordance with some embodiments of the present disclosure. Now referring to FIG. 3, the architectural overview includes an image analysis module 302, a classification and potential cocktail computation module 304, an AR based display module 306, an object identification module 308, a volume computation module 310, a dynamic liquid level detection module 312 and an updating module 314. The above modules are present in the liquid measurement and mapping unit 114. The image analysis module 312 receives the image of a shelf and performs segmentation of each beverage container by using an image segmentation method. The segmented beverage containers are further classified by the classification and potential cocktail computation module 314 using a pre-trained Convolutional Neural Network (CNN) model trained using various shapes and sizes of beverage containers. Further, the plurality of potential cocktails are computed by the classification and potential cocktail computation module 314. The AR based display module 316 displays the plurality of potential cocktails along with the appearance of each of the plurality of potential cocktails using AR. The object identification module 308 identifies the glassware placed by the user on the flat surface and the volume computation module 310 computes the volume of the glassware. Further, the dynamic liquid level detection module 312 dynamically measures the quantity of each beverage added by the user each time and checks whether the added quantity of each liquid is as per the predefined quantity. If there is any deviation from the predetermined quantity, the module 312 recommends the user to add appropriate quantity of beverages to be further added to make the cocktail tasty and also suggests to add an alternate beverage. The updating module 314 updates the quantity of consumed beverages and alarms the store keeper if any of the beverage is out of stock or emptied.

The liquid measurement and mapping unit 114, when executed by the one or more processors of the system 100, receives the image pertaining to the shelf or the cabinet by the image acquisition unit. The shelf comprises the plurality of glass containers with beverages.

Further, the liquid measurement and mapping unit 114, when executed by one or more processors of the system 100, classifies the plurality of glass containers based on the plurality characteristics associated with each of the plurality of glass containers. The plurality of characteristics comprises the size, the color, and the shape of each of the plurality of glass containers. The glass containers are classified based on the pre-trained CNN trained with a plurality of training glass container images with varying shapes and sizes used commonly. In an embodiment, the training glass container images are obtained from open source image database.

Further, the liquid measurement and mapping unit 114, when executed by one or more processors of the system 100, computes the plurality of potential cocktails based on the plurality of classified glass containers available in the shelf or cabinet and the quantity of each beverage in each of the plurality of classified glass containers.

Further, the liquid measurement and mapping unit 114, when executed by one or more processors of the system 100, displays the computed plurality of potential cocktails and the corresponding appearance of each of the plurality of potential cocktails using 3D AR on a flat surface. The flat surface can be a table or a similar 3D object, where the user can place the glassware for cocktail preparation. The flat surface is located by the pre-trained ML model. The display procedure includes one of, a text based procedure, an image based procedure and a video based procedure. The outcome corresponding to each of a plurality of steps associated with the procedure is dynamically displayed using 3D AR. The video based procedure is displayed using 3D AR.

Further, the liquid measurement and mapping unit 114, when executed by one or more processors of the system 100, receives the cocktail request from the user. The cocktail request is made by the user based on the plurality of potential cocktails and the corresponding appearance displayed on the flat surface. In an embodiment, example cocktails includes Sauza Peach Margarita and A Hole in One. These cocktails can be created by mixing Triple Sec, Peachtree, Sauza Tequila, Read Label and Sour mix in various combinations.

Further, the liquid measurement and mapping unit 114, when executed by one or more processors of the system 100, locates the transparent glassware placed by the user on the flat surface by using the pre-trained 3D object detection ML model. The pre-trained 3D object detection ML model is trained with a plurality of 3D object images of commonly used glassware for preparing cocktails and tested in real time environment. Here, the transparent glassware is placed on the flat surface by the user. The transparent glassware is located by using marker based AR techniques. The glassware is identified by mapping the 3D model of the located glassware identified using the marker based AR technique to the elements in the pre-trained 3D object detection ML model.

Further, the liquid measurement and mapping unit 114, when executed by one or more processors of the system 100, dynamically displays the procedure to prepare the requested cocktail near the located transparent glassware using the 3D AR.

Further, the liquid measurement and mapping unit 114, when executed by one or more processors of the system 100, simultaneously computes the first set of 3D points associated with the transparent glassware using AR measurement techniques.

Figure 4A:
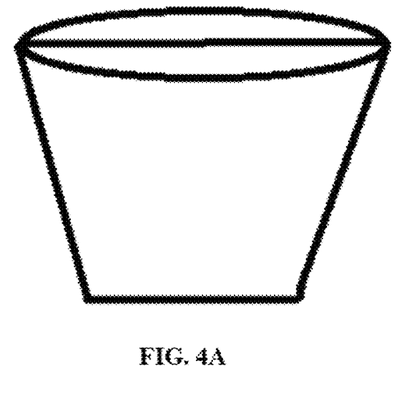
FIGS. 4A and 4B illustrates a 2D view of a glassware and a first set of 3D points associated with the glassware, in accordance with some embodiments of the present disclosure.
Figure 4B:
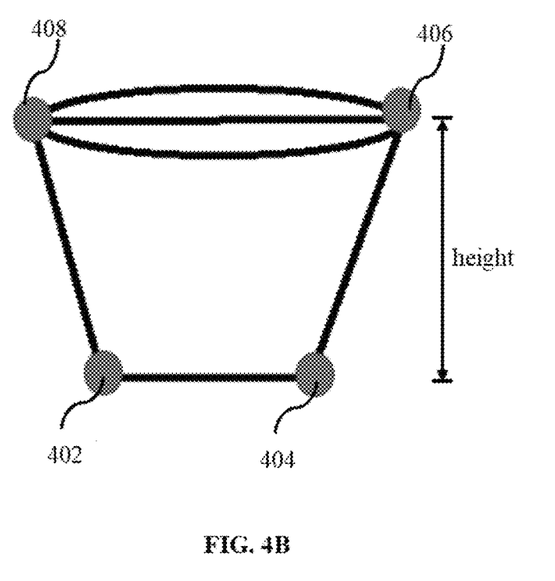

FIGS. 4A and 4B illustrates a 2D view of the glassware and a plurality of edge points associated with the glassware, in accordance with some embodiments of the present disclosure. FIG. 4A illustrates a 2D view of the glassware FIG. 4B illustrates the plurality of 3D points associated with the glassware of FIG. 4A. Now referring to FIG. 4B, the first set of 3D points includes the first base edge point 402, the second base edge point 404, the first top point 406 and the second top point 406.

Further, the liquid measurement and mapping unit 114, when executed by one or more processors of the system 100, computes the distance between the located transparent glassware and the image acquisition unit by using AR measurement techniques.

Further, the liquid measurement and mapping unit 114, when executed by one or more processors of the system 100, computes the total volume of the transparent glassware based on the computed plurality of 3D points and the distance. In an embodiment, the transparent glassware is represented as a trapezium as shown in FIGS. 4A and 4B.

Further, the liquid measurement and mapping unit 114, when executed by one or more processors of the system 100, dynamically determines the quantity of each of the plurality of beverages corresponding to the requested cocktail to be added in the transparent glassware based on the computed volume.

Further, the liquid measurement and mapping unit 114, when executed by one or more processors of the system 100, dynamically detects the quantity of each beverage added by the user in the transparent glassware each time by using dynamic liquid level detection. Initially, the upper level of each beverage added in the glass is computed based on the difference in color between the transparent glassware and the added beverage using a color mapping algorithm. Further, the second set of 3D points are computed on the upper level of the liquid. The second set of 3D points includes the first liquid top point and the second liquid top point. Further, the volume of the added beverage is computed based on the computed second set of 3D points and the distance. Further, the quantity of each beverage added into the transparent glassware is compared with the corresponding predefined quantity of beverage to be added as per the dynamically displayed procedure to find any deviation in quantity of added beverage. The deviation can be an increase in quantity of added beverage or a decrease in quantity of added beverage. Further, recommendation is given to the user based on the deviation. The recommendation can be a (a) quantity of remaining beverages to be added, if there is increase in quantity of added beverage and (b) a plurality of available alternate beverages if there is any decrease in the quantity of added beverage. Further, the availability of each beverage is updated based on the quantity of each beverage added to the requested cocktail each time and the stock keeper or bartender is alarmed when any of glass containers arranged in the shelf is emptied based on the updated information.

In an embodiment, a pseudo code for computing the total volume is given below.

Let a and b be the two edge points on the base of the glassware
Let c and d be the two edge points of the top of the glassware
Represent a, b, c, d in a 3D space
Declare a, b, c, d
Let "base" be the base length of the 3D object, "top" be the top of the 3D
object and "height" be the height of the 3D object
Declare base, top, height, volume
base←Vector3.Distance(a, b)
top←Vector3.Distance(c, d)
baseMid←(a+b)/2
topMid←(c+d)/2
height←Vector3. Distance(baseMid, topMid)
//Converting local scale to world scale
base←Camera.ScreenToWorldPoint(base)
top←Camera.ScreenToWorldPoint(top)
height←Camera. ScreenToWorldPoint(height)
volume←π/24*height*(base*base+top*top+base*top)

In an embodiment, the color mapping algorithm performs a comparison between an initial transparent state of the glassware and a level of transparency obtained after the beverage is added into the glassware. The transparency is measured with the variations in color before and after the beverage has been added. The variations in color is identified using a pre-trained CNN model which has been trained with multiple variations of glass containers with and without liquid.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of providing an AR based visualization of cocktail and enabling the user to prepare a cocktail using the AR based techniques. Here, each beverage added by the user is dynamically measured using AR based techniques and compared with the predetermined quantity to be added. Further, the system is able to recommend the user, (i) quantity of remaining beverages to be added, if there is increase in quantity of added beverage and (b) a plurality of available alternate beverages if there is any decrease in the quantity of added beverage.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor implemented method, the method comprising:

receiving, an image pertaining to a shelf by one or more hardware processors via an image acquisition unit, wherein the shelf comprises a plurality of glass containers with beverages;

classifying, by one or more hardware processors, the plurality of glass containers based on a plurality characteristics associated with each of the plurality of glass containers;

generating, by one or more hardware processors, a plurality of potential cocktails based on the plurality of classified glass containers and a quantity of each beverage in each of the plurality of classified glass containers;

displaying, by one or more hardware processors, the generated plurality of potential cocktails and a corresponding appearance of the plurality of potential cocktails using 3 Dimensional (3D) Augmented Reality (AR) on a flat surface, wherein the flat surface is located by a pre-trained Machine Learning (ML) model;

receiving, by one or more hardware processors, a cocktail request from a user, wherein the cocktail request is made by the user based on the plurality of potential cocktails displayed on the flat surface;

locating, by one or more hardware processors, a transparent glassware placed by the user on the flat surface by using the pre-trained ML model;

dynamically displaying, by one or more hardware processors, a procedure to prepare the requested cocktail near the located transparent glassware using the 3D AR;

simultaneously computing, by one or more hardware processors, a first set of 3D points associated with the transparent glassware using AR measurement techniques, wherein the first set of 3D points comprises a first base edge point, a second base edge point, a first top point and a second top point;

computing, by one or more hardware processors, a distance between the located transparent glassware and the image acquisition unit by using AR measurement techniques;

computing, by one or more hardware processors, a total volume of the transparent glassware based on the computed plurality of 3D points and the distance;

dynamically determining, by one or more hardware processors, the quantity of each of a plurality of beverages corresponding to the requested cocktail to be added in the transparent glassware based on the computed volume; and dynamically detecting, by one or more hardware processors, a quantity of each beverage added by the user in the transparent glassware each time by using dynamic liquid level detection, by:

identifying an upper level of each beverage added in the glass based on a difference in color between the transparent glassware and the added beverage using a color mapping algorithm;

computing a second set of 3D points on the upper level of the liquid, wherein the second set of 3D points comprises a first liquid top point, a second liquid top point;

computing a volume of the added beverage based on the computed second set of 3D points and the distance;

comparing the quantity of each beverage added into the transparent glassware with a corresponding predefined quantity of beverage to be added as per the dynamically displayed procedure to find any deviation in quantity of added beverage, wherein the deviation comprises one of, increase in quantity of added beverage and decrease in quantity of added beverage; and recommending the user based on the deviation, wherein the recommendation comprising:
quantity of remaining beverages to be added, if there is increase in quantity of added beverage; and
a plurality of available alternate beverages if there is any decrease in the quantity of added beverage;

updating an availability of each beverage based on the quantity of each beverage added to the requested cocktail each time; and alarming a stock keeper when any of glass containers arranged in the shelf is emptied based on the updated information.

2. The processor implemented method of claim 1, wherein the plurality of characteristics comprises a size, a color and a shape of each of the plurality of glass containers.

3. The processor implemented method of claim 1, wherein the cocktail comprises a plurality of beverages mixed in a predefined proportion.

4. The processor implemented method of claim 1, wherein the procedure comprises one of, a text based procedure, an image based procedure and a video based procedure.

5. The processor implemented method of claim 1, wherein an outcome corresponding to each of a plurality of steps associated with the procedure is dynamically displayed using 3D AR.

6. A system comprising:
at least one memory storing programmed instructions;
one or more Input/Output (I/O) interfaces; and
one or more hardware processors operatively coupled to the at least one memory, wherein the one or more hardware processors are configured by the programmed instructions to:
receive an image pertaining to a shelf by one or more hardware processors via an image acquisition unit, wherein the shelf comprises a plurality of glass containers with beverages;
classify the plurality of glass containers based on a plurality characteristics associated with each of the plurality of glass containers;
generate a plurality of potential cocktails based on the plurality of classified glass containers and a quantity of each beverage in each of the plurality of classified glass containers;
display the generated plurality of potential cocktails and a corresponding appearance of the plurality of potential cocktails using 3 Dimensional (3D) Augmented Reality (AR) on a flat surface, wherein the flat surface is located by a pre-trained Machine Learning (ML) model;
receive a cocktail request from a user, wherein the cocktail request is made by the user based on the plurality of potential cocktails displayed on the flat surface;
locate a transparent glassware placed by the user on the flat surface by using the pre-trained ML model;
dynamically display a procedure to prepare the requested cocktail near the located transparent glassware using the 3D AR;
simultaneously compute a first set of 3D points associated with the transparent glassware using AR measurement techniques, wherein the first set of 3D points comprises a first base edge point, a second base edge point, a first top point and a second top point;
compute a distance between the located transparent glassware and the image acquisition unit by using AR measurement techniques;
compute a total volume of the transparent glassware based on the computed plurality of 3D points and the distance;
dynamically determine the quantity of each of a plurality of beverages corresponding to the requested cocktail to be added in the transparent glassware based on the computed volume; and
dynamically detect a quantity of each beverage added by the user in the transparent glassware each time by using dynamic liquid level detection, by:
identifying an upper level of each beverage added in the glass based on a difference in color between the transparent glassware and the added beverage using a color mapping algorithm;
computing a second set of 3D points on the upper level of the liquid, wherein the second set of 3D points comprises a first liquid top point, a second liquid top point;
computing a volume of the added beverage based on the computed second set of 3D points and the distance;
comparing the quantity of each beverage added into the transparent glassware with a corresponding predefined quantity of beverage to be added as per the dynamically displayed procedure to find any deviation in quantity of added beverage, wherein the deviation comprises one of, increase in quantity of added beverage and decrease in quantity of added beverage; and
recommending the user based on the deviation, wherein the recommendation comprising:
quantity of remaining beverages to be added, if there is increase in quantity of added beverage; and
a plurality of available alternate beverages if there is any decrease in the quantity of added beverage;
updating an availability of each beverage based on the quantity of each beverage added to the requested cocktail each time; and
alarming a stock keeper when any of glass containers arranged in the shelf is emptied based on the updated information.

7. The system of claim 6, wherein the plurality of characteristics comprises a size, a color and a shape of each of the plurality of glass containers.

8. The system of claim 6, wherein the cocktail comprises a plurality of beverages mixed in a predefined proportion.

9. The system of claim 6, wherein the procedure comprises one of, a text based procedure, an image based procedure and a video based procedure.

10. The system of claim 6, wherein an outcome corresponding to each of a plurality of steps associated with the procedure is dynamically displayed using 3D AR.

11. A non-transitory computer readable medium embodying a program executable in a computing device, the program comprising:
receiving an image pertaining to a shelf by one or more hardware processors via an image acquisition unit, wherein the shelf comprises a plurality of glass containers with beverages;
classifying the plurality of glass containers based on a plurality characteristics associated with each of the plurality of glass containers;

generating a plurality of potential cocktails based on the plurality of classified glass containers and a quantity of each beverage in each of the plurality of classified glass containers;

displaying the generated plurality of potential cocktails and a corresponding appearance of the plurality of potential cocktails using 3 Dimensional (3D) Augmented Reality (AR) on a flat surface, wherein the flat surface is located by a pre-trained Machine Learning (ML) model;

receiving a cocktail request from a user, wherein the cocktail request is made by the user based on the plurality of potential cocktails displayed on the flat surface;

locating a transparent glassware placed by the user on the flat surface by using the pre-trained ML model;

dynamically displaying a procedure to prepare the requested cocktail near the located transparent glassware using the 3D AR;

simultaneously computing a first set of 3D points associated with the transparent glassware using AR measurement techniques, wherein the first set of 3D points comprises a first base edge point, a second base edge point, a first top point and a second top point;

computing a distance between the located transparent glassware and the image acquisition unit by using AR measurement techniques;

computing a total volume of the transparent glassware based on the computed plurality of 3D points and the distance;

dynamically determining the quantity of each of a plurality of beverages corresponding to the requested cocktail to be added in the transparent glassware based on the computed volume; and dynamically detecting a quantity of each beverage added by the user in the transparent glassware each time by using dynamic liquid level detection, by:
identifying an upper level of each beverage added in the glass based on a difference in color between the transparent glassware and the added beverage using a color mapping algorithm;
computing a second set of 3D points on the upper level of the liquid, wherein the second set of 3D points comprises a first liquid top point, a second liquid top point;
computing a volume of the added beverage based on the computed second set of 3D points and the distance;
comparing the quantity of each beverage added into the transparent glassware with a corresponding pre-defined quantity of beverage to be added as per the dynamically displayed procedure to find any deviation in quantity of added beverage, wherein the deviation comprises one of, increase in quantity of added beverage and decrease in quantity of added beverage; and
recommending the user based on the deviation, wherein the recommendation comprising:
quantity of remaining beverages to be added, if there is increase in quantity of added beverage; and
a plurality of available alternate beverages if there is any decrease in the quantity of added beverage;
updating an availability of each beverage based on the quantity of each beverage added to the requested cocktail each time; and
alarming a stock keeper when any of glass containers arranged in the shelf is emptied based on the updated information.

\* \* \* \* \*